(12) United States Patent
Huang et al.

(10) Patent No.: US 9,971,129 B2
(45) Date of Patent: *May 15, 2018

(54) OPTICAL LENS ASSEMBLY AND ELECTRONIC DEVICE

(71) Applicant: LARGAN PRECISION CO., LTD., Taichung (TW)

(72) Inventors: Yeo-Chih Huang, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/584,058

(22) Filed: May 2, 2017

(65) Prior Publication Data

US 2017/0235100 A1 Aug. 17, 2017

Related U.S. Application Data

(63) Continuation of application No. 14/800,491, filed on Jul. 15, 2015, now Pat. No. 9,671,527.

(30) Foreign Application Priority Data

Apr. 27, 2015 (TW) ............................. 104113416 A
May 13, 2015 (TW) ............................. 104115266 A

(51) Int. Cl.
*G02B 13/00* (2006.01)
*G02B 5/20* (2006.01)
(Continued)

(52) U.S. Cl.
CPC ........... *G02B 13/008* (2013.01); *G02B 1/041* (2013.01); *G02B 5/003* (2013.01); *G02B 5/208* (2013.01); *H04M 1/0264* (2013.01)

(58) Field of Classification Search
CPC .... G02B 1/041; G02B 3/0031; G02B 3/0075; G02B 5/003; G02B 5/208; G02B 13/001;
(Continued)

(56) References Cited

U.S. PATENT DOCUMENTS 5,665,957 A * 9/1997 Lee .................. B29D 11/00009
250/201.5
5,822,135 A * 10/1998 Lee .................. B29D 11/00009
359/738

(Continued)

*Primary Examiner* — Frank Font
(74) *Attorney, Agent, or Firm* — McClure, Qualey & Rodack, LLP

(57) ABSTRACT

An optical lens assembly, which has an optical axis, includes, at least one dual molded lens element having two plastic parts with different colors. The dual molded lens element includes a transparent portion and a light absorbing portion, wherein the transparent portion has an optical effective region. The dual molded lens element has an outer diameter surface connecting a first side surface and a second side surface of the dual molded lens element, the transparent portion is arranged from an optical effective region of the dual molded lens element to the outer diameter surface and surrounds the dual molded lens element, thus the transparent portion is a part of the outer diameter surface, and the light absorbing portion is located on one of the first side surface and the second side surface of the dual molded lens element.

15 Claims, 8 Drawing Sheets

(51) Int. Cl.
    *G02B 5/00*         (2006.01)
    *G02B 1/04*         (2006.01)
    *H04M 1/02*       (2006.01)

(58) Field of Classification Search
    CPC ........ B29D 11/00009; B29D 11/00413; B29C
                              45/0062; B29C 45/14
    USPC ................. 359/356, 722, 738, 888; 264/1.32
    See application file for complete search history.

(56) References Cited

U.S. PATENT DOCUMENTS

| | | | | |
|---|---|---|---|---|
| 6,819,508 B2* | 11/2004 | Chiang | | G02B 7/022 |
| | | | | 359/796 |
| 7,391,457 B2* | 6/2008 | Fujimoto | | G02B 7/022 |
| | | | | 348/340 |
| 7,545,583 B2* | 6/2009 | Hayashi | | G02B 1/11 |
| | | | | 359/708 |
| 8,031,412 B2* | 10/2011 | Shintani | | G02B 7/102 |
| | | | | 359/738 |
| 8,102,609 B2* | 1/2012 | Tsuchiya | | G02B 7/021 |
| | | | | 359/811 |
| 8,455,810 B2* | 6/2013 | Tomioka | | G02B 7/022 |
| | | | | 250/208.1 |
| 8,599,501 B2* | 12/2013 | Chang | | G02B 7/02 |
| | | | | 359/811 |
| 8,736,989 B2* | 5/2014 | Wu | | G02B 7/025 |
| | | | | 359/811 |
| 8,817,396 B2* | 8/2014 | Mori | | B29C 45/0062 |
| | | | | 359/808 |
| 8,947,795 B2* | 2/2015 | Kobayashi | | B29D 11/0073 |
| | | | | 264/1.1 |
| 8,964,313 B2* | 2/2015 | Kobayashi | | B29D 11/0073 |
| | | | | 264/1.1 |
| 8,964,314 B2* | 2/2015 | Koike | | G02B 3/00 |
| | | | | 264/1.32 |
| 9,581,784 B2* | 2/2017 | Ishiguri | | G02B 7/02 |
| 2002/0018177 A1* | 2/2002 | Dillon | | G02C 7/00 |
| | | | | 351/159.62 |
| 2002/0027715 A1* | 3/2002 | Shimizu | | B29D 11/00278 |
| | | | | 359/619 |
| 2002/0063348 A1* | 5/2002 | Imamura | | G02B 3/0031 |
| | | | | 264/1.1 |
| 2006/0126186 A1* | 6/2006 | Kanda | | G02B 3/005 |
| | | | | 359/622 |
| 2010/0047380 A1* | 2/2010 | Widman | | B29D 11/00009 |
| | | | | 425/174.4 |
| 2011/0002053 A1* | 1/2011 | Ovrutsky | | B29D 11/00278 |
| | | | | 359/738 |
| 2011/0096413 A1* | 4/2011 | Lo | | G02B 13/004 |
| | | | | 359/717 |
| 2011/0149143 A1* | 6/2011 | Tsujino | | G02B 3/0031 |
| | | | | 348/374 |
| 2012/0057100 A1* | 3/2012 | Masuda | | B29C 33/3878 |
| | | | | 349/62 |
| 2012/0176688 A1* | 7/2012 | Oh | | B29D 11/0073 |
| | | | | 359/738 |
| 2013/0021672 A1* | 1/2013 | Yamamura | | B29D 11/00298 |
| | | | | 359/619 |
| 2013/0313730 A1* | 11/2013 | Fujii | | B29C 45/1671 |
| | | | | 264/1.7 |
| 2014/0185134 A1* | 7/2014 | Kamitakahara | | G02B 13/0035 |
| | | | | 359/356 |
| 2014/0334019 A1* | 11/2014 | Ishiguri | | G02B 7/02 |
| | | | | 359/738 |
| 2014/0347752 A1* | 11/2014 | Koike | | C03B 11/08 |
| | | | | 359/819 |
| 2015/0035180 A1* | 2/2015 | Shen | | B29C 47/0028 |
| | | | | 264/1.7 |

* cited by examiner

OPTICAL LENS ASSEMBLY AND ELECTRONIC DEVICE

RELATED APPLICATIONS

The present application is a continuation of the application Ser. No. 14/800,491, filed Jul. 15, 2015, which claims priority to Taiwan Application Serial Number 104113416, filed Apr. 27, 2015, and Taiwan Application Serial Number 104115266, filed May 13, 2015, which are herein incorporated by reference.

BACKGROUND

Technical Field

The present disclosure relates to an optical lens assembly with dual molded lens element. More particularly, the present disclosure relates to an optical lens assembly applicable to an electronic device.

Description of Related Art

In the field of portable photographing devices, such as mobile phones, the size, thickness and weight of the optical lens assembly thereof are decreased for satisfying the demand of miniaturization, however, the amount of the components in photographing devices is increased for enhancing the image quality at the same time. Hence, it is difficult for effectively controlling the stray light without decreasing the aligning precision of the lens elements.

In the conventional lens assembling structure for the compact lens assembly, such as U.S. Pat. No. 6,819,508, the aligning precision of the lens assembly can be maintained. When the stray light is generated in the lens assembly, the ink coating or the light shutter is usually used. However, both of the ink coating or the light shutter would affect the lens assembling structure for the aligning precision of the lens assembly.

In detail, it is difficult to control the surface shape and size by the general ink coating process under the compact size, thus the micron meter or above variation would be generated on the portion with ink coating. Therefore, the aligning precision of the lens assembly would be decreased or the lens element thereof would be tilted when the assembling surface of the lens element with ink coating, and the image quality would be degraded. Furthermore, when the ink coating is coated on the inner corner portion, the gap would easily be generated and the stray light would be further induced.

The light shutter can provide expert dimensional accuracy controlling ability than the ink coating which is applied to the lens assembly for avoiding the stray light. However, the light shutter has larger reflectivity, and the covered area is decreased when the shutter is directly embedded with the lens element, and the ability for controlling the stray light would be restricted.

Therefore, it is important for providing the lens assembly which satisfies both of the aligning precision of the lens assembly and the demand of the stray light control.

SUMMARY

According to one aspect of the present disclosure, an optical lens assembly, which has an optical axis, includes at least one lens element and at least one dual molded lens element. The dual molded lens element has two plastic parts with different colors, is formed by an injection molding method, and includes a transparent portion, a light absorbing portion and at least one axial connecting surface. The axial connecting surface is located on one side of the dual molded lens element for connecting the lens element which is adjacent to the axial connecting surface, thus a center of the dual molded lens element and a center of the lens element are aligned.

According to another aspect of the present disclosure, an electronic device includes a camera module. The camera module includes the optical lens assembly according to the aforementioned aspect and an image sensor, wherein the image sensor is disposed on an image surface of the optical lens assembly.

According to further another aspect of the present disclosure, an optical lens assembly, which has an optical axis, includes at least one dual molded lens element. The dual molded lens element has two plastic parts with different colors, and includes a transparent portion having an optical effective region and a light absorbing portion. The dual molded lens element has an outer diameter surface connecting a first side surface and a second side surface of the dual molded lens element, the transparent portion is arranged from an optical effective region of the dual molded lens element to the outer diameter surface and surrounds the dual molded lens element, thus the transparent portion is a part of the outer diameter surface, and the light absorbing portion is located on one of the first side surface and the second side surface of the dual molded lens element.

According to still another aspect of the present disclosure, an electronic device includes a camera module. The camera module includes the optical lens assembly according to the aforementioned aspect and an image sensor, wherein the image sensor is disposed on an image surface of the optical lens assembly.

DETAILED DESCRIPTION

Figure 1:
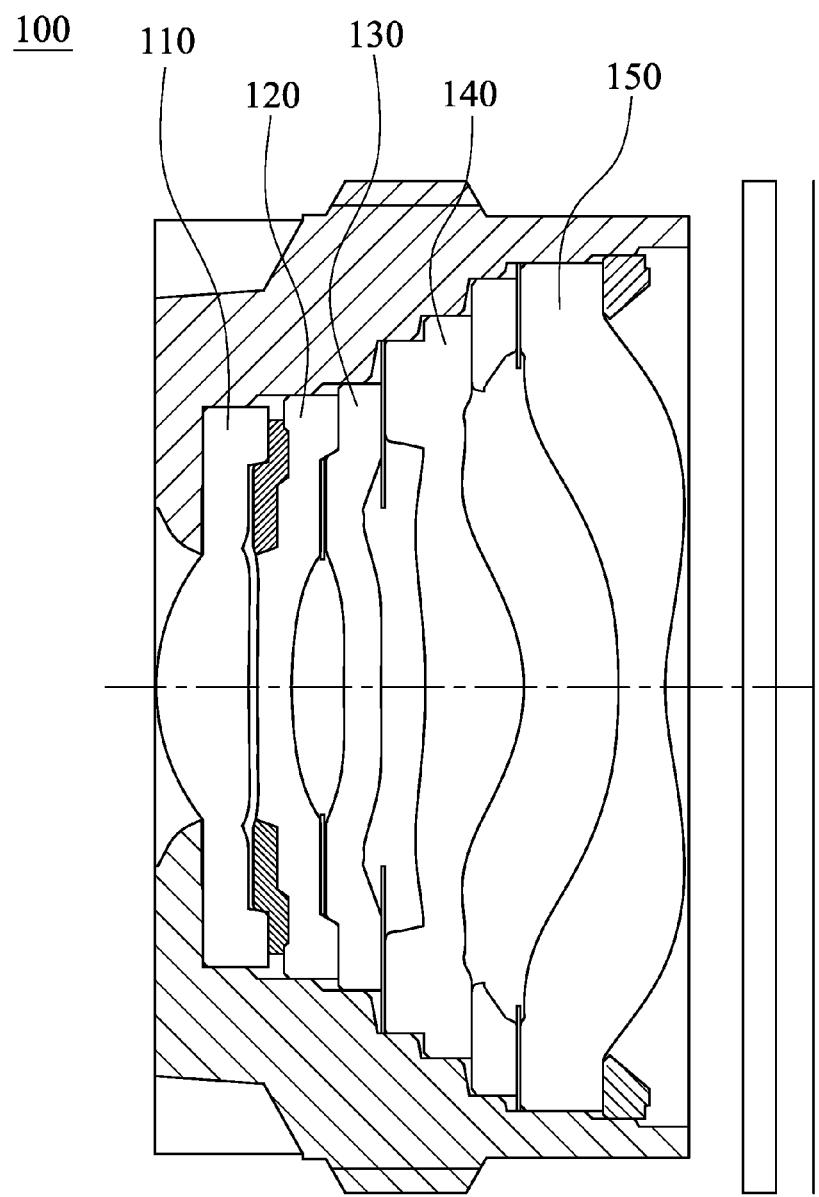
FIG. 1 is a schematic view of an optical lens assembly according to the 1st embodiment of the present disclosure.

FIG. 1 is a schematic view of an optical lens assembly 100 according to the 1st embodiment of the present disclosure. In FIG. 1, the optical lens assembly 100 is applied to a camera module of a mobile phone, wherein the camera module of the mobile phone includes the optical lens assembly 100, an image sensor (not shown) and an IR-cut filter (not shown). The optical lens assembly 100 includes five lens elements with refractive power, in order from a first side to a second side, a first lens element 110, a dual molded lens element 120 (a second lens element), a third lens element 130, a fourth lens element 140 and a fifth lens element 150.

Figure 2:
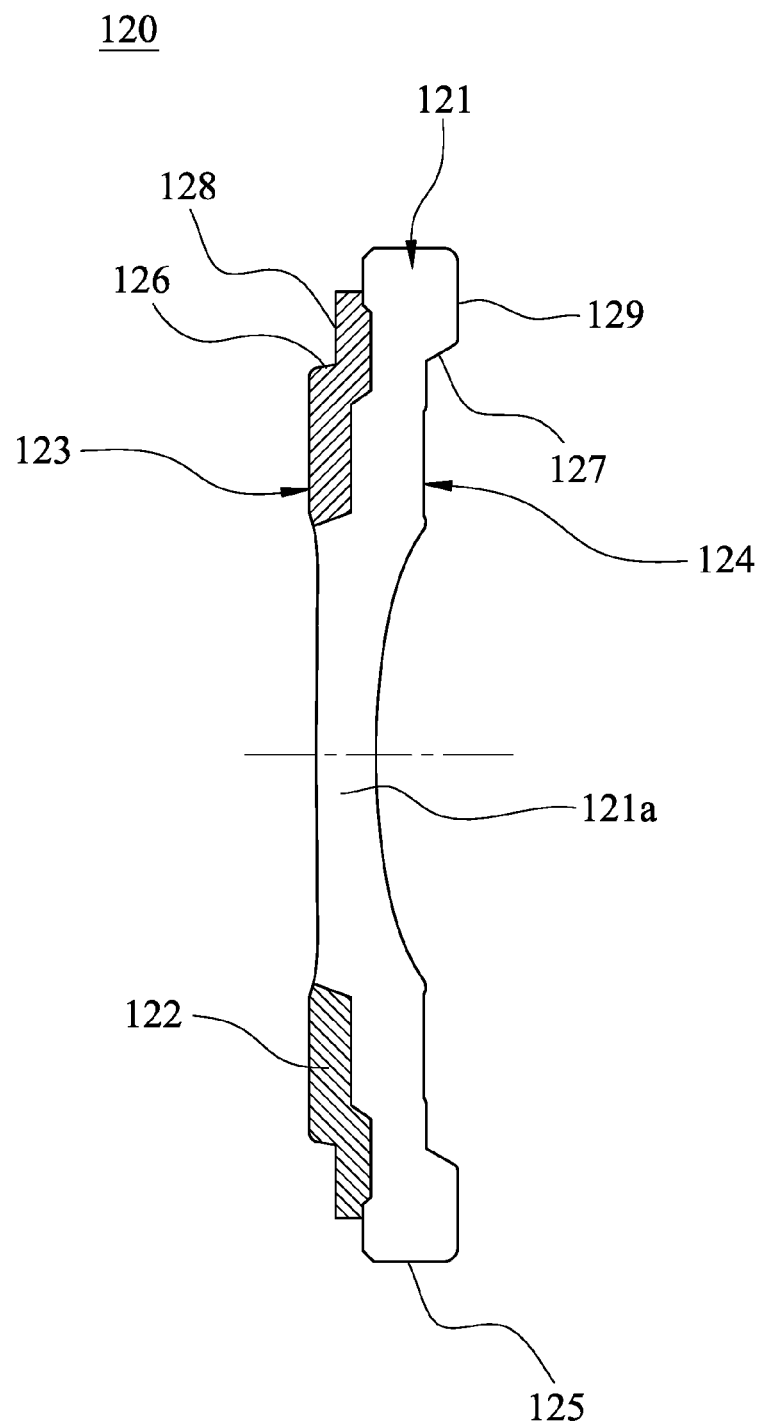
FIG. 2 is an enlarged view of the dual molded lens element of the optical lens assembly of FIG. 1.

FIG. 2 is an enlarged view of the dual molded lens element 120 of the optical lens assembly 100 of FIG. 1. In detail, the dual molded lens element 120 is made of plastic material, and includes a transparent portion 121 and a light absorbing portion 122. The transparent portion 121 has an optical effective region 121a, wherein the transparent portion 121 is made of transparent PC (Polycarbonate) with high refraction. The light absorbing portion 122 is made of black PC. That is, the dual molded lens element has two plastic parts with different colors by different color arrangement of the transparent portion 121 and the light absorbing portion 122.

Two side surfaces of the dual molded lens element 120 are a first side surface 123 and a second side surface 124, and the dual molded lens element 120 has an outer diameter surface 125 connecting the first side surface 123 and a second side surface 124. The transparent portion 121 is arranged from an optical effective region of the dual molded lens element 120 to the outer diameter surface 125 (that is, from the optical effective region 121a to the outer diameter surface 125), and the outer diameter surface 125 of the dual molded lens element 120 includes at least an outer diameter surface of the transparent portion 121 which is a part of the outer diameter surface 125. According to the 1st embodiment, the outer diameter surface 125 of the dual molded lens element 120 is the outer diameter surface of the transparent portion 121 which surrounds the dual molded lens element. The outer diameter surface 125 may be an outer diameter assembling surface for connecting to a lens barrel. Therefore, the dual molded lens element 120 can be connected to other element of the optical lens assembly, such as a lens barrel, via the outer diameter surface 125, so as to align the center of each lens element during arrangement.

The light absorbing portion 122 is located on one side surface of the dual molded lens element 120 (in the 1st embodiment, the light absorbing portion 122 is located on the first side surface 123 of the dual molded lens element 120).

The optical lens assembly 100 can further include axial connecting surface, in the 1st embodiment, the optical lens assembly 100 includes two axial connecting surfaces 126, 127 located on two sides of the dual molded lens element 120, respectively, which are disposed on the light absorbing portion 122 and the transparent portion 121, respectively. The axial connecting surfaces 126, 127 are for connecting the first lens element 110 and the third lens element 130 which are adjacent thereto. Hence, a center of the dual molded lens element 120 and the centers of the lens elements (the first lens element 110 and the third lens element 113) are aligned on the optical axis.

The optical lens assembly 100 can further include at least one horizontal connecting surface, in the 1st embodiment, the optical lens assembly 100 includes two horizontal connecting surfaces 128, 129 located on two sides of the dual molded lens element 120, respectively, which are disposed on the light absorbing portion 122 and the transparent portion 121, respectively. The horizontal connecting surfaces 128, 129 are for connecting the first lens element 110 and the third lens element 130 which are adjacent thereto. Therefore, axial distances between the dual molded lens element 120 and the lens elements (the first lens element 110 and the third lens element 113) are formed.

Figure 3:
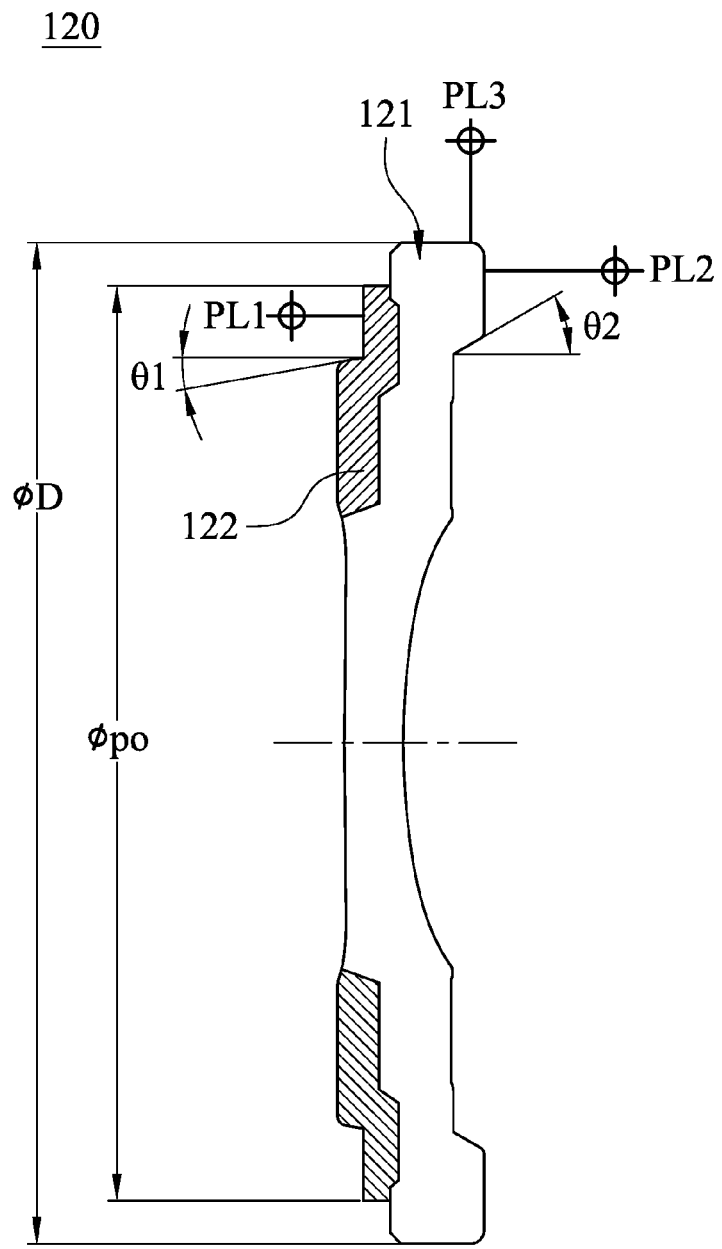
FIG. 3 is a schematic view of parameters θ1, θ2, Φpo and ΦD of the dual molded lens element of the optical lens assembly of FIG. 1.

The optical lens assembly 100 can include at least one axial connecting surface, wherein when an angle between the axial connecting surface and the optical axis is θ, and the following condition is satisfied: 0 degrees<θ<40 degrees. Preferably, the following condition can be satisfied: 5 degrees<θ<31 degrees. FIG. 3 is a schematic view of parameters θ1, θ2, Φpo and ΦD of the dual molded lens element 120 of the optical lens assembly 100 of FIG. 1. In FIG. 3, according to the 1st embodiment, the optical lens assembly 100 includes two axial connecting surfaces 126, 127, wherein an angle between the axial connecting surface 126 and the optical axis is θ1, and θ1=10 degrees; an angle between the axial connecting surface 126 and the optical axis is θ2, and θ2=30 degrees. Therefore, the dual molded lens element 120 can be stably connected to the first lens element 110 and the third lens element 130 for aligning the center of the dual molded lens element 120 to the centers of the adjacent lens elements. Moreover, the angels of the connecting surfaces of the lens elements which are adjacent and connected to the dual molded lens element 120 would be adjusted with θ1 and θ2.

When an outer diameter of the dual molded lens element 120 is ΦD, and an outer diameter of the light absorbing portion 122 is Φpo, the following conditions are satisfied: 2.5 mm<ΦD<8.0 mm; and 0.5<Φpo/ΦD≤1.0. In the 1st embodiment, ΦD=3.76 mm, and Φpo/ΦD=0.91.

Figure 4A:
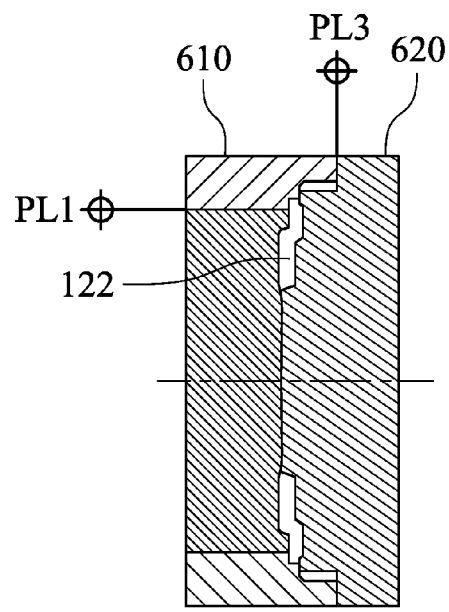
FIG. 4A is a schematic view of the first step of a manufacturing method for the dual molded lens element according to the 1st embodiment of the present disclosure.
Figure 4B:
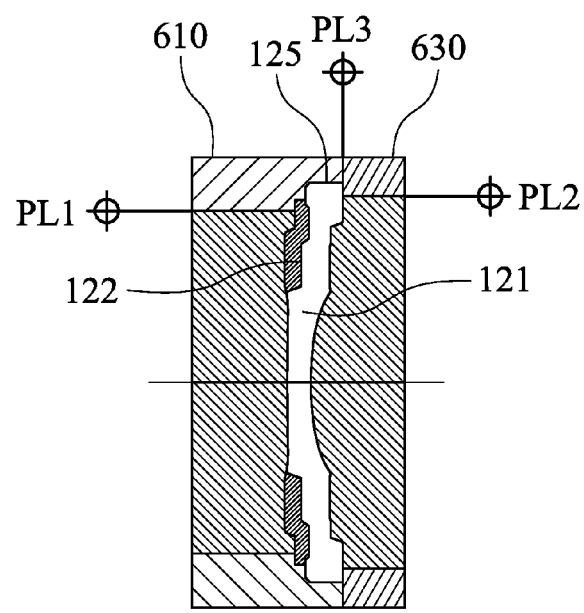
FIG. 4B is a schematic view of the second step of the manufacturing method for the dual molded lens element according to the 1st embodiment of the present disclosure.

FIG. 4A is a schematic view of the first step of a manufacturing method for the dual molded lens element 120 according to the 1st embodiment of the present disclosure. FIG. 4B is a schematic view of the second step of the manufacturing method for the dual molded lens element 120 according to the 1st embodiment of the present disclosure. According to the first step of FIG. 4A, the light absorbing portion 122 is formed by an injection molding method in a mold cavity between a movable mold 610 and a first fixed mold 620. Then, according to the second step of FIG. 4B, the movable mold 610 is moved for forming the other mold cavity between the movable mold 610 and a second fixed mold 630, that is, the light absorbing portion 122 would be moved into the other mold cavity, and the transparent portion 121 can be formed by another injection molding method in the other mold cavity. Hence, the dual molded lens element 120 with two colors can be formed by twice injection molding methods with two kinds of plastic materials.

In general, after forming the dual molded lens element and separating the mold, the parting surfaces would be formed on the dual molded lens element, wherein the parting surface which is located on the outer diameter surface thereof and extends along the horizontal direction is a horizontal parting surface, and the parting surface which is located on the first side surface or the second side surface and extends along the perpendicular direction is a perpendicular parting surface.

In the 1st embodiment, the dual molded lens element 120 further includes two perpendicular parting surfaces PL1, PL2 and a horizontal parting surface PL3. The perpendicular parting surface PL1 is located on an outer side surface of the light absorbing portion 122 (two side surfaces of the light absorbing portion 122 are an inner side surface and the outer side surface, the inner side surface is connected to the transparent portion 121, and the outer side surface is the side surface on the other side). The perpendicular parting surface PL2 is located on an outer side surface of the transparent portion 121 (two side surfaces of the transparent portion 121 are an inner side surface and the outer side surface, the inner side surface is connected to the light absorbing portion 122, and the outer side surface is the side surface on the other side). The horizontal parting surface PL3 is located on the outer diameter surface 125 of the dual molded lens element 120. Both of the perpendicular parting surface PL1 and the axial connecting surface 126 are located on the outer side surface of the light absorbing portion 122 (that is, located on the same side of the dual molded lens element 120), and a vertical distance between the perpendicular parting surface PL1 and the optical axis is larger than a vertical distance between the axial connecting surface 126 and the optical axis. Both of the perpendicular parting surface PL2 and the axial connecting surface 127 are located on the outer side surface of the transparent portion 121 (that is, located on the same side of the dual molded lens element 120), and a vertical distance between the perpendicular parting surface PL2 and the optical axis is larger than a vertical distance between the axial connecting surface 127 and the optical axis. Therefore, the dimensional accuracy of the lens can be increased by the perpendicular parting surfaces.

Moreover, in the first step of the aforementioned manufacturing method, the plastic material of the light absorbing portion 122 can be injected from the border between the transparent portion 121 and the light absorbing portion 122, or the outer side of the dual molded lens element 120. In the second step of the aforementioned manufacturing method, the plastic material of the transparent portion 121 can be injected along the direction from the outer diameter surface to the optical axis.

Furthermore, the material of the transparent portion 121 not only can be transparent PC with high refraction, such as Teijin SP-series, EP-series of MGC, but also can be Polyester, such as OKP-series of OGC, or others conventional optical plastic material. The material of the light absorbing portion 122 should correspond to the material of the transparent portion 121, which can be black PC, such as Teijin L-1225Y, or the material which can be passed through by the infrared light (which is transparent to an infrared light). Of course, the material of the light absorbing portion 122 is not limited to black PC. When the transparent portion 121 is made of the material excluding PC, such as COC, COP, PMMA etc., the light absorbing portion 122 can be made of the material as the transparent portion 121, and the material can be mixed with black material for producing the black plastic material as the material of the light absorbing portion 122. According to the camera module of the present disclosure or the conventional camera module, the proper IR cut filter can be provided, and will not affect the property provided by the light absorbing portion.

Figure 5:
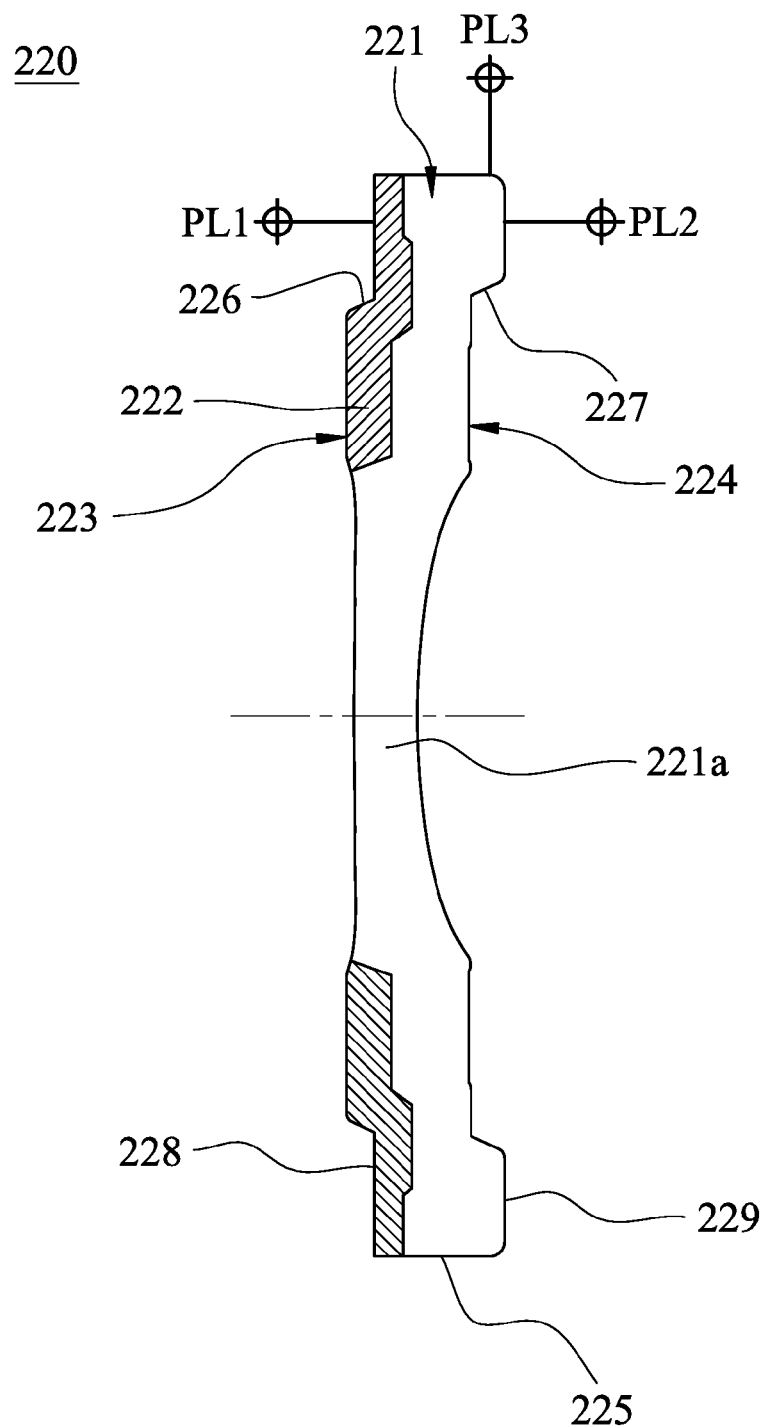
FIG. 5 is an enlarged view of a dual molded lens element of an optical lens assembly according to the 2nd embodiment of the present disclosure.

FIG. 5 is an enlarged view of a dual molded lens element 220 of an optical lens assembly according to the 2nd embodiment of the present disclosure. In FIG. 5, the optical lens assembly (not shown) is applied to a camera module of a mobile phone, wherein the camera module of the mobile phone includes the components which are the same with the camera module of the mobile phone according to the 1st embodiment, and will not state again herein. In the 2nd embodiment, the optical lens assembly includes at least one lens element and a dual molded lens element 220, wherein the arrangement of the lens element and the dual molded lens element 220 is the same with the arrangement shown in FIG. 1, and will not describe again herein.

According to the 2nd embodiment in FIG. 5, the dual molded lens element 220 has two portions made of different plastic materials with different colors, which are a transparent portion 221 and a light absorbing portion 222. The transparent portion 221 has an optical effective region 221*a*, wherein the transparent portion 221 is made of transparent PC with high refraction. The light absorbing portion 222 is made of PC which can absorb visible light and be passed through by the infrared light (which is transparent to an infrared light). That is, the dual molded lens element 220 has two plastic parts with different colors by different color arrangement of the transparent portion 221 and the light absorbing portion 222.

Two side surfaces of the dual molded lens element 220 are a first side surface 223 and a second side surface 224, and the dual molded lens element 220 has an outer diameter surface 225 connecting the first side surface 223 and a second side surface 224. The transparent portion 221 is arranged from an optical effective region of the dual molded lens element 220 to the outer diameter surface 225 (that is, from the optical effective region 221*a* to the outer diameter surface 225), and the outer diameter surface 225 consists of the transparent portion 221 and the light absorbing portion 222. Therefore, the dual molded lens element 220 can be connected to other element of the optical lens assembly, via the outer diameter surface 225, so as to align the center of each lens element during arrangement.

The light absorbing portion 222 is located on one side surface of the dual molded lens element 220 (in the 2nd embodiment, the light absorbing portion 222 is located on the first side surface 223 of the dual molded lens element 220). During the manufacturing and assembling, the homogeneity in the dual molded lens element can be confirmed by the non-operating wave band by different transmittances of the transparent portion 221 and the light absorbing portion 222. Therefore, the yield rate of the manufacturing can be increased by the precise location of the light absorbing portion.

In the 2nd embodiment, the optical lens assembly includes two axial connecting surfaces 226, 227 located on two sides of the dual molded lens element 220, respectively, which are disposed on the light absorbing portion 222 and the transparent portion 221, respectively. The axial connecting surfaces 226, 227 are for connecting the lens elements (such as a first lens element and a third lens element) which are adjacent thereto. Hence, a center of the dual molded lens element 220 and the centers of the lens elements are aligned on the optical axis.

In the 2nd embodiment, the optical lens assembly includes two horizontal connecting surfaces 228, 229 located on two sides of the dual molded lens element 220, respectively, which are disposed on the light absorbing portion 222 and the transparent portion 221, respectively. The horizontal connecting surfaces 228, 229 are for connecting the lens elements (such as a first lens element and a third lens element) which are adjacent thereto. Therefore, axial distances between the dual molded lens element 220 and the lens elements are formed.

In the 2nd embodiment, the light absorbing portion 220 further includes two perpendicular parting surfaces PL1, PL2 and a horizontal parting surface PL3. The perpendicular parting surface PL1 is located on an outer side surface of the light absorbing portion 222 and is on the same side with the axial connecting surface 226, and a vertical distance between the perpendicular parting surface PL1 and the optical axis is larger than a vertical distance between the axial connecting surface 226 and the optical axis. The perpendicular parting surface PL2 is located on an outer side surface of the transparent portion 221 and is on the same side with the axial connecting surface 227, and a vertical distance between the perpendicular parting surface PL2 and the optical axis is larger than a vertical distance between the axial connecting surface 227 and the optical axis.

In the 2nd embodiment, the definitions of the parameters θ1, θ2, Φpo and ΦD of the dual molded lens element 220 shown in the following table are the same as those stated in the 1st embodiment and FIG. 3, so an explanation in this regard will not be provided again. The values of the parameters and condition of the 2nd embodiment are stated as following table.

| θ1 (deg.) | θ2 (deg.) | φpo (mm) | φpo/φD |
|---|---|---|---|
| 20 | 20 | 3.76 | 1.0 |

Moreover, the manufacturing method of the dual molded lens element 220 is the same with the 1st embodiment shown in FIGS. 4A and 4B, and will not describe again herein.

Figure 6:
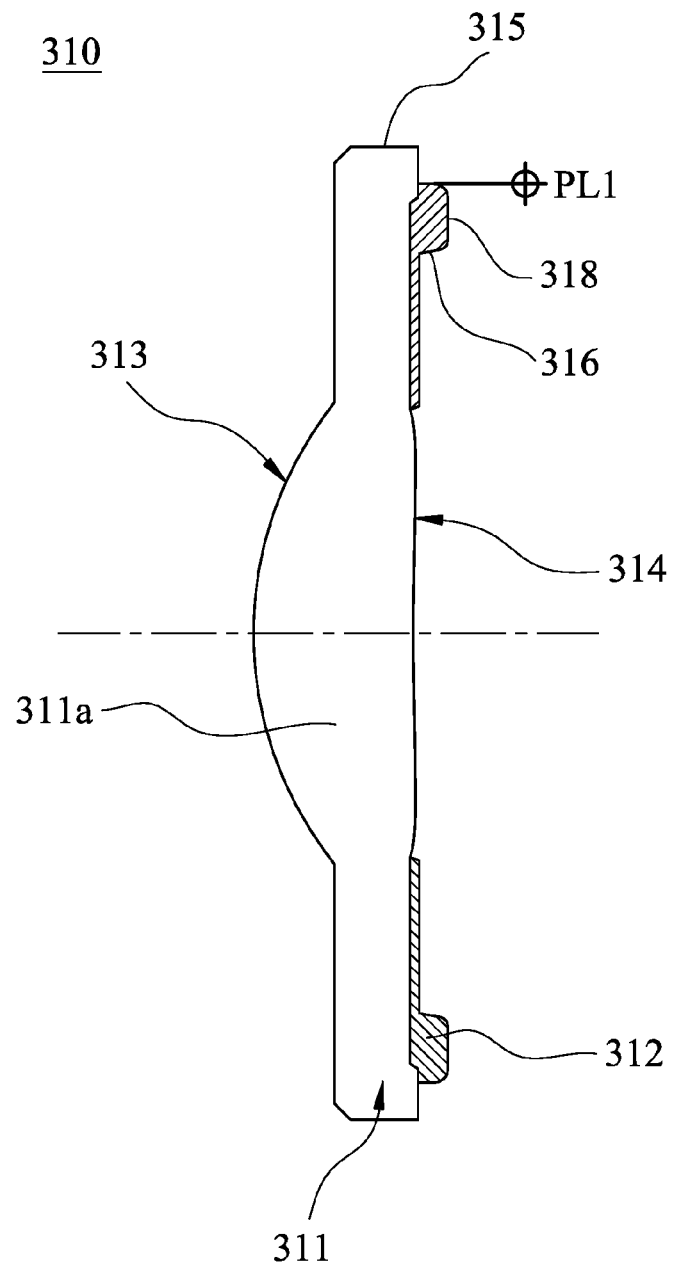
FIG. 6 is an enlarged view of a dual molded lens element of an optical lens assembly according to the 3rd embodiment of the present disclosure.

FIG. 6 is an enlarged view of a dual molded lens element 310 of an optical lens assembly according to the 3rd embodiment of the present disclosure. In FIG. 6, the optical lens assembly (not shown) is applied to a camera module of a mobile phone, wherein the camera module of the mobile phone includes the components which are the same with the camera module of the mobile phone according to the 1st embodiment, and will not state again herein. In the 3rd embodiment, the optical lens assembly includes at least one lens element and a dual molded lens element 310, wherein the dual molded lens element 310 is nearest to the first side of the optical lens assembly among all lens elements thereof as a first lens element. In the optical lens assembly of the 3rd embodiment, the arrangement of the lens element and other components is the same with the arrangement shown in FIG. 1, and will not describe again herein.

According to the 3rd embodiment in FIG. 6, the dual molded lens element 310 has two portions made of different plastic materials with different colors, which are a transparent portion 311 and a light absorbing portion 312. The transparent portion 311 has an optical effective region 311a, wherein the transparent portion 311 is made of COC. The light absorbing portion 312 is located on the second side surface 314 of the dual molded lens element 310, and is made of black COC. That is, the dual molded lens element 310 has two plastic parts with different colors by different color arrangement of the transparent portion 311 and the light absorbing portion 312.

Two side surfaces of the dual molded lens element 310 are a first side surface 313 and the second side surface 314, and the dual molded lens element 310 has an outer diameter surface 315 connecting the first side surface 313 and the second side surface 314. The transparent portion 311 is arranged from an optical effective region of the dual molded lens element 310 to the outer diameter surface 315 (that is, from the optical effective region 311a to the outer diameter surface 315), and the outer diameter surface 315 consists of the transparent portion 311. Therefore, the dual molded lens element 310 can be connected to other element of the optical lens assembly, such as a lens barrel, via the outer diameter surface 315, so as to align the center of each lens element during arrangement.

In the 3rd embodiment, the dual molded lens element 310 includes an axial connecting surface 316 and a horizontal connecting surface 318, wherein the axial connecting surface 316 and the horizontal connecting surface 318 are located on the light absorbing portion 312 and for connecting the lens elements (such as a second lens element) which are adjacent thereto. Hence, a center of the dual molded lens element 310 and the center of the adjacent lens element are aligned on the optical axis, and the axial distance between the dual molded lens element 310 and the adjacent lens element is formed.

In the 3rd embodiment, the dual molded lens element 310 includes a perpendicular parting surface PL1 located on an outer side surface of the light absorbing portion 312 and is on the same side with the axial connecting surface 316, wherein a vertical distance between the perpendicular parting surface PL1 and the optical axis is larger than a vertical distance between the axial connecting surface 316 and the optical axis.

In the 3rd embodiment, the definitions of the parameters θ, Φpo and ΦD of the dual molded lens element 310 shown in the following table are the same as those stated in the 1st embodiment and FIG. 3, so an explanation in this regard will not be provided again. Especially, in the 3rd embodiment, the dual molded lens element 310 includes one axial connecting surface 316, so that there is only one angle θ, and the definition and the location of θ are the same with θ1 of the 1st embodiment. The values of the parameters and condition of the 3rd embodiment are stated as following table.

| θ (deg.) | φpo (mm) | φpo/φD |
|---|---|---|
| 10 | 3.6 | 0.9 |

Moreover, the manufacturing method of the dual molded lens element 310 is the same with the 1st embodiment shown in FIGS. 4A and 4B, and will not describe again herein.

Figure 7:
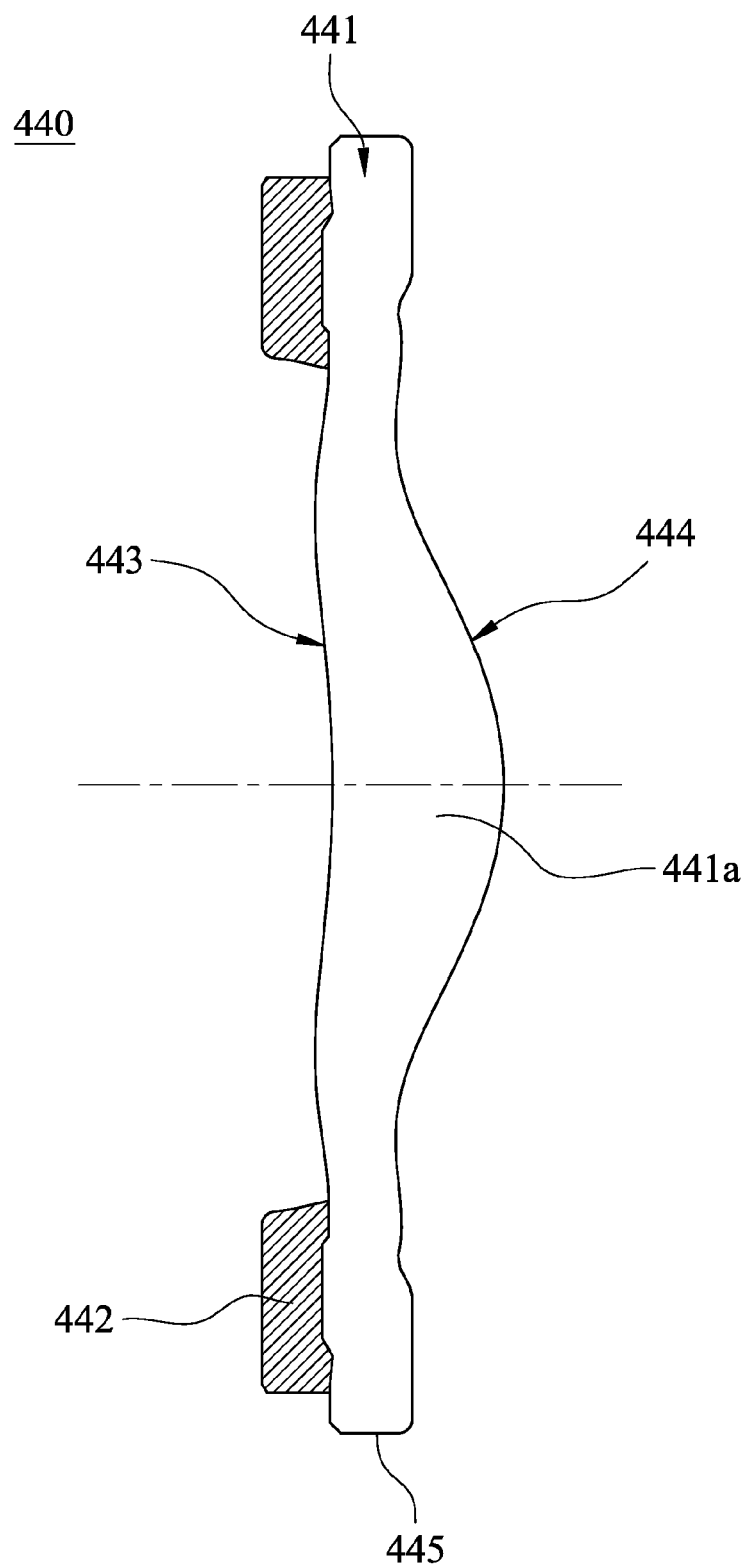
FIG. 7 is an enlarged view of a dual molded lens element of an optical lens assembly according to the 4th embodiment of the present disclosure.

FIG. 7 is an enlarged view of a dual molded lens element 440 of an optical lens assembly according to the 4th embodiment of the present disclosure. In FIG. 7, the optical lens assembly (not shown) is applied to a camera module of a mobile phone, wherein the camera module of the mobile phone includes the components which are the same with the camera module of the mobile phone according to the 1st embodiment, and will not state again herein. In the 4th embodiment, the optical lens assembly includes four lens elements and a dual molded lens element 440, wherein the dual molded lens element 440 is located as the fourth lens element from the first side to the second side of the optical lens assembly among all lens elements thereof. In the optical lens assembly of the 4th embodiment, the arrangement of the lens elements and other components is the same with the arrangement shown in FIG. 1, and will not describe again herein.

According to the 4th embodiment in FIG. 7, the dual molded lens element 440 has two portions made of different plastic materials with different colors, which are a transparent portion 441 and a light absorbing portion 442. The transparent portion 441 has an optical effective region 441a, wherein the transparent portion 441 is made of COC. The light absorbing portion 442 is located on the first side surface 443 of the dual molded lens element 440, and is made of black COC. That is, the dual molded lens element 440 has two plastic parts with different colors by different color arrangement of the transparent portion 441 and the light absorbing portion 442.

Two side surfaces of the dual molded lens element 440 are the first side surface 443 and a second side surface 444, and the dual molded lens element 440 has an outer diameter surface 445 connecting the first side surface 443 and the second side surface 444. The transparent portion 441 is arranged from an optical effective region of the dual molded lens element 440 to the outer diameter surface 445 (that is, from the optical effective region 441a to the outer diameter surface 445), and the outer diameter surface 445 consists of the transparent portion 441. Therefore, the dual molded lens element 440 can be connected to other element of the optical lens assembly, such as a lens barrel, via the outer diameter surface 445, so as to align the center of each lens element during arrangement.

In the 4th embodiment, the definitions of the parameters Φpo and ΦD of the dual molded lens element 440 shown in the following table are the same as those stated in the 1st embodiment and FIG. 3, so an explanation in this regard will not be provided again. The values of the parameter and condition of the 4th embodiment are stated as following table.

| φpo (mm) | φpo/φD |
|---|---|
| 4.78 | 0.94 |

Moreover, the manufacturing method of the dual molded lens element 440 is the same with the 1st embodiment shown in FIGS. 4A and 4B, and will not describe again herein.

Figure 8:
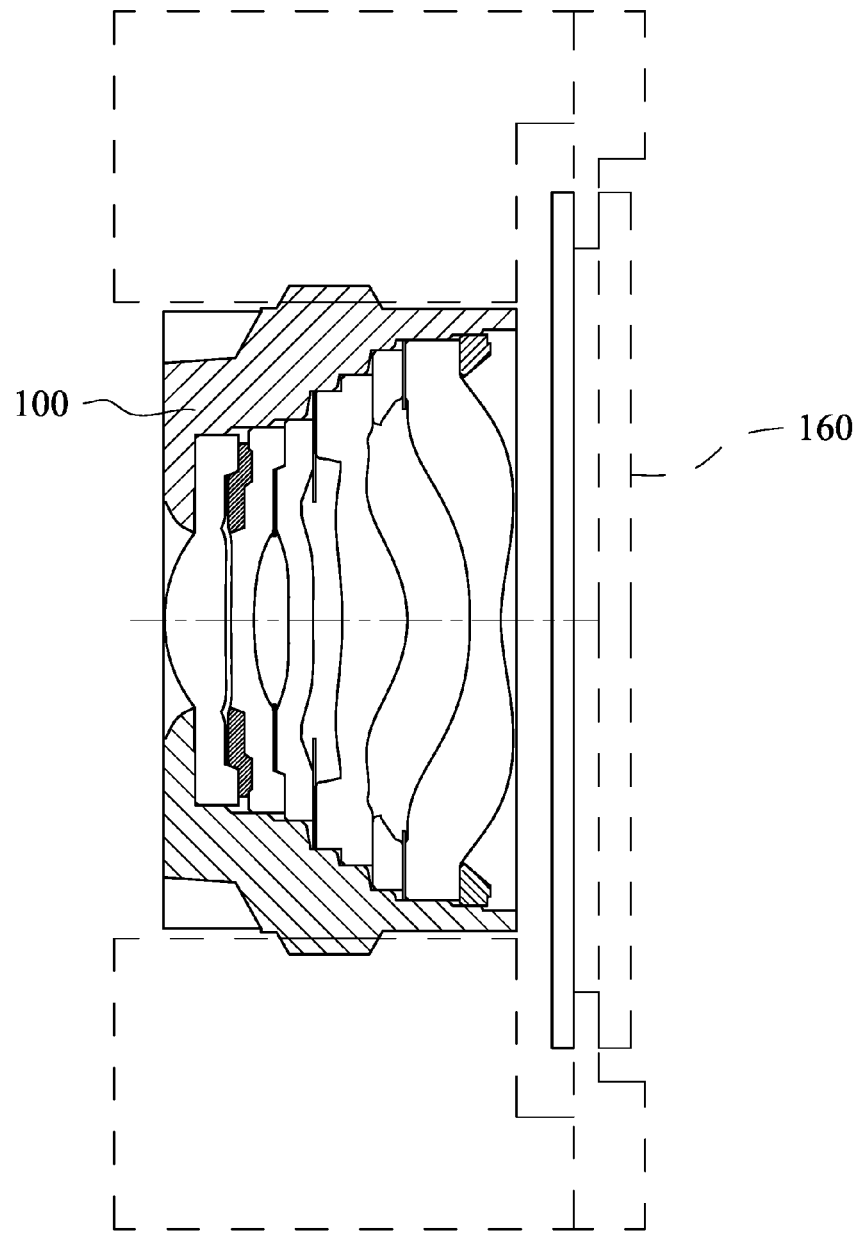
FIG. 8 is a schematic view of a camera module of an electronic device according to the 5th embodiment of the present disclosure.

FIG. 8 is a schematic view of a camera module 50 of an electronic device according to the 5th embodiment of the present disclosure. In FIG. 8, the electronic device (not shown) is a mobile phone, and the camera module 50 is applied to the mobile phone. The camera module 50 includes an optical lens assembly 100 and an image sensor 160, wherein the image sensor 160 is disposed on an image surface (not shown) of the optical lens assembly 100. In the 5th embodiment, the optical lens assembly 100 is stated as the optical lens assembly 100 according to the 1st embodiment in FIG. 1, and will not be is described again herein.

Furthermore, in the present disclosure, the optical lens assembly is not be limited to the optical lens assembly having five lens elements with refractive power, the number of the lens elements with refractive power of the optical lens assembly can also be three, four, five, six or others. The electronic device is not limited to mobile phones, and can also be other portable electronic devices, such as tablet computers.

Moreover, in the present disclosure, the optical lens assembly with the dual molded lens element can decrease the stray light for enhancing the image quality; however, the dual molded lens element is preferably arranged as the second lens element from an object side to an image side, or the second lens element from the image side to the object side. Further, when the optical lens assembly provides the wider field of view, the dual molded lens element can be arranged as the first lens element from the object side to the image side for increasing the characteristic.

The foregoing description, for purpose of explanation, has been described with reference to specific embodiments. It is to be noted that the tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and is are not intended to be exhaustive or to limit the scope of the present disclosure to the precise forms disclosed. Many modifications and variations are possible in view of the above teachings.

What is claimed is:

1. An optical lens assembly, which has an optical axis, comprising:
   at least one dual molded lens element having two plastic parts with different colors, the dual molded lens element comprising:
   a transparent portion having an optical effective region; and
   a light absorbing portion;
   wherein the dual molded lens element has an outer diameter surface connecting a first side surface and a second side surface of the dual molded lens element, the transparent portion is arranged from the optical effective region of the dual molded lens element to the outer diameter surface and surrounds the dual molded lens element, thus the transparent portion is a part of the outer diameter surface, and the light absorbing portion is located on one of the first side surface and the second side surface of the dual molded lens element;
   wherein an outer diameter of the dual molded lens element is ψD, and the following condition is satisfied:

$2.5 \text{ mm} < \psi D < 8.0 \text{ mm}.$

2. The optical lens assembly of claim 1, wherein the dual molded lens element further comprises:
   at least one axial connecting surface located on one side of the dual molded lens element.

3. The optical lens assembly of claim 2, wherein the dual molded lens element is formed by an injection molding method.

4. The optical lens assembly of claim 2, wherein the axial connecting surface is disposed on the light absorbing portion.

5. The optical lens assembly of claim 3, wherein the axial connecting surface is disposed on the light absorbing portion.

6. The optical lens assembly of claim 2, wherein the axial connecting surface is disposed on the transparent portion.

7. The optical lens assembly of claim 4, wherein the axial connecting surface is disposed on the transparent portion.

8. The optical lens assembly of claim 5, wherein the axial connecting surface is disposed on the transparent portion.

9. The optical lens assembly of claim 3, wherein the dual molded lens element further comprises:
   a perpendicular parting surface formed by being separated from a mold of the dual molded lens element, the perpendicular parting surface is located on the side of the dual molded lens element, and a vertical distance vertical to the optical axis between the perpendicular parting surface and the optical axis is larger than a vertical distance vertical to the optical axis between the axial connecting surface and the optical axis.

10. The optical lens assembly of claim 4, wherein the dual molded lens element further comprises:
    a perpendicular parting surface formed by being separated from a mold of the dual molded lens element, the perpendicular parting surface and the axial connecting surface are located on the same side of the dual molded lens element which the light absorbing portion is located on, and a vertical distance vertical to the optical axis between the perpendicular parting surface and the optical axis is larger than a vertical distance vertical to the optical axis between the axial connecting surface and the optical axis.

11. The optical lens assembly of claim 4, wherein the light absorbing portion has an inner side surface and an outer side surface, the inner side surface is connected to the transparent portion, and the optical lens assembly further comprises:

a perpendicular parting surface formed by being separated from a mold of the dual molded lens element, the perpendicular parting surface and the axial connecting surface are located on the outer side surface, and a vertical distance vertical to the optical axis between the perpendicular parting surface and the optical axis is larger than a vertical distance vertical to the optical axis between the axial connecting surface and the optical axis.

12. The optical lens assembly of claim 4, wherein the dual molded lens element further comprises:

at least one horizontal connecting surface located on the light absorbing portion and vertical to the optical axis for connecting to one lens element of the optical lens assembly adjacent thereto, thus an axial distance between the dual molded lens element and the lens element is formed.

13. The optical lens assembly of claim 6, wherein the outer diameter of the dual molded lens element is $\psi D$, an outer diameter of the light absorbing portion is $\psi po$, and the following condition is satisfied:

$$0.5 < \psi po/\psi D \leq 1.0.$$

14. The optical lens assembly of claim 2, wherein the outer diameter surface is for connecting to a lens barrel.

15. An electronic device, comprising:
a camera module, comprising:
the optical lens assembly of claim 1; and
an image sensor, wherein the image sensor is disposed on an image surface of the optical lens assembly.

* * * * *